United States Patent [19] [11] 4,427,887
Berthold [45] Jan. 24, 1984

[54] METHOD FOR QUENCH CORRECTION IN LIQUID SCINTILLATION COUNTERS

[76] Inventor: Fritz Berthold, 753 Pforzheim, Weissenburgstr. 12 a, Fed. Rep. of Germany

[21] Appl. No.: 219,820

[22] Filed: Dec. 24, 1980

[30] Foreign Application Priority Data

Dec. 24, 1979 [DE] Fed. Rep. of Germany ....... 2952321

[51] Int. Cl.³ .............................................. G01T 1/20
[52] U.S. Cl. ................................... 250/328; 250/366
[58] Field of Search ............... 250/361.1, 328, 363 R, 250/252.1, 364, 369

[56] References Cited

U.S. PATENT DOCUMENTS 3,560,744 2/1971 Jordan ................................. 250/328
4,060,728 11/1977 Horrocks .
4,075,480 2/1978 Horrocks .
4,187,426 2/1980 Jordan ................................. 250/328
4,292,520 9/1981 Jordan ................................. 250/328

OTHER PUBLICATIONS

Horrocks, "Applications of Liquid Scintillation Counting", Academic Press, Inc. 1974, pp. 208-225.

Primary Examiner—Janice A. Howell
Attorney, Agent, or Firm—Spencer & Frank

[57] ABSTRACT

A method for determining the quench corrected counting yield of samples which emit ionizing radiation that is subject to quenching in a liquid scintillation counter. The output signal of a photoelectric transducer device is used to measure the counting rates of the sample spectrum in different given pulse height ranges. A value characteristic for the quenching is derived from the measurement to determine a quench corrected counting a yield. The value characteristic for the quenching is derived by assigning a given numerical relationship between the counting rates in the different given pulse height ranges; choosing a shift parameter which when varied causes a relative shift between the given pulse height ranges, on the one hand, and the sample spectrum on the other hand; effecting the relative shift by varying the shift parameter until the counting rates take on the given numerical relationship; and determining the shift parameter value that produces the numerical relationship as the value characteristic for the quenching.

28 Claims, 10 Drawing Figures

METHOD FOR QUENCH CORRECTION IN LIQUID SCINTILLATION COUNTERS

BACKGROUND OF THE INVENTION

The invention relates to a method for quench correction of samples emitting ionizing radiation in a liquid scintillation counter, possibly with the use of an external standard.

A liquid scintillation counter detects ionizing radiation, such as, for example, beta radiation, from an unknown sample introduced in a scintillator solution comprising a solvent and a fluorescent substance. The fluorescent substance then changes from its excited state to its normal state while emitting photons. The higher the energy of the emitting isotope, the more molecules of the fluorescent substance are excited and the stronger is the intensity of the emitted flash of light of the respective excitation or scintillation, of the fluorescent material. The electrical signal emitted by a measuring transducer, e.g. two coincidences connected photomultipliers, is generally proportional to this light intensity and thus proportional to the energy of the nuclear radiation actuating the excitation. In order to distinguish between nuclear radiations, or decay events of different energy, the electrical pulses emitted by the measuring transducer are discriminated according to pulse height. The spectra of various pulse height ranges can thus be associated with various electron radiation emitting nuclides, which may possibly be contained in the respective sample and differ in their beta spectra.

However, losses occur during the detection of nuclear radiation events.

Controllable losses whose specific parameters can be kept constant in a controlled manner during the entire measurement, e.g. from among a plurality of losses, those due to incomplete light collection, will not be discussed here in detail.

Practically the only uncontrollable loss is the loss from so-called quenching. Depending on whether the light emission itself is impaired in the course of converting the energy produced by the nuclear radiation or whether it is the subsequent light transmission into the photoelectric transducers that is impaired, a distinction is made between chemical quenching and color quenching. In practice, there exist neither qualitatively nor quantitatively predictable cases of a mixture of chemical and color quenching.

The counting yield ZA is understood to mean the quotient of the actual counts per minute, cpm, counted after pulse height discrimination and the real disintegrations per minute, dpm. If the counting yield is known, it is possible to determine the rate of disintegration, which is what is of ultimate interest, from the measured pulse rate according to the equation $$\text{rate of disintegration } [dpm] = \frac{\text{pulse rate } [cpm]}{\text{counting yield}}$$

This can be done by either summarily determining the counting yield without distinguishing between chemical quenching and color quenching, which, however, considerably reduces accuracy; or, as will be explained in detail below with the aid of a novel method, both quenching factors can be considered separately.

There exist a number of prior art methods for determining the counting yield ZA. Pointed out in particular should be the internal standard method wherein, after measuring the counting rate, a known quantity of calibration radioactivity is added to the sample and the sample is counted again; the sample channels ratio method, wherein the counting yield is determined via the pulse rate ratio between two pulse height ranges of the sample spectrum and is brought into a relationship with calibration measurements at increasing degrees of quench, the quenching effect shifting the pulse spectrum toward lower energies; and the external standard channels ratio method wherein, in a modification of the sample channels ratio, the channels ratio is changed by irradiation of the sample with an external standard, e.g. a gamma radiator such as $^{137}$Cs, generating a Compton spectrum which is more or less superposed on the sample spectrum, the Compton spectrum being subject to a shift analogous to that of the sample spectrum.

Regarding the details of the prior art on which the species of the present invention is based, the terminology employed and the mechanisms serving as its basis as well as the prior art generic technique for determining quench corrected counting yields, reference is made particularly to German Offenlegungsschrift No. 2,521,904 by the same applicant, particularly the introduction to the specification up to page 13, and to U.S. Pat. No. 4,075,480, particularly the introduction to the specification up to column 4, line 55. Applicable modern prior art is also disclosed in U.S. Pat. Nos. 4,029,401 and 4,060,728 as well as German Offenlegungsschriften [applications published without examination] Nos. 1,623,050, 2,725,750 and 2,726,840. Each of the prior art methods for determining the quench corrected counting yield have certain inherent drawbacks. Reference is further made to the latter part of the detailed description of this specification which defines various technical terms that form the basis of the invention herein.

The method according to U.S. Pat. No. 4,075,480 uses the position of an inflection point in a pulse height spectrum as a measure for the degree of quench. However, the position of this point is greatly dependent on statistical fluctuations as well as on very slight differential nonlinearities of the entire amplifier arrangement, particularly of a logarithmic amplifier. Moreover, often an inflection point cannot be observed at all in the pulse height spectra actually under observation. In some sections, the descent seems to be defined by a straight line so that after an inflection point a search circuit may arrive at results which are due to random events.

In the conventional external standard channels ratio method, ESCR, it may happen that the spectra shift from fixed, preselected channels and thus any quench correction will become considerably less accurate or, in the borderline case, not possible at all. Moreover, as in other prior art methods for determining the quench corrected counting yield, the sensitivities of the measurement are often unsatisfactory.

SUMMARY OF THE INVENTION

It is therefore the object of the invention to provide a new way for determining the counting yield which results in high sensitivity during quench correction with good adaptation to the actually measured pulse height spectra.

The method according to the invention can be used either with the sample spectrum itself or with the spectrum of an external standard. Different amplification characteristics can be used, such as the linear or the logarithmic characteristic.

One then defines pulse height regions which each have either an upper and a lower threshold or only an upper threshold or only a lower threshold. If pulse height regions are used which have a lower as well as an upper threshold, channels can be provided which have a functionally given width. In the simplest case this means that the channels have a constant width, which is preferably used in conjunction with logarithmic amplification. With linear amplification, the channel width is preferably proportional to the channel position (a position parameter may be, for example, a lower threshold, an upper theshold or an average value), One now assigns a numerical relationship of pulse rates between the individual pulse height ranges. This numerical relationship serves as the basis for adjusting at least one variable "shift parameter". According to the invention, this shift parameter is varied in such a manner until it produces the given numerical relationship between the given pulse height ranges. The value is obtained for the shift parameter is then used as the basis for the characteristic value for the quench.

Various possibilities exist for fixing the shift parameter. For example, channels which have a functionally given width as explained above, i.e. channels which have, for example, a constant width or a width which changes in proportion with the channel position or according to another given function, can be shifted in their position until the numerical relationship between at least two channels has been reached. Then the channel position is the shift parameter. Or, a lower or an upper threshold of an otherwise fixed pulse height range which is limited or unlimited at its other end can be selected as the shift parameter. Moreover, even with nonvariable pulse height ranges as the shift parameter, the amplification factor or the high voltage of a photomultiplier arrangement serving as the photoelectric transducer device can be used, for example, as the shift parameter. Thus, broadly stated, the "shift parameter" is a parameter of the output signal from the photoelectric transducer device since the form of that output signal is dependent on the input signal to, and the gain of, that transducer device.

In addition to varying the shift of entire pulse height ranges or functionally given channels or individual thresholds of such channels, respectively, it is possible, according to the method of the invention, to also change both ends of the pulse height range, for example to spread them according to a given parameter.

The given numerical relationship between the defined pulse height ranges can either be arrived at by making iterative measurements by means of a search circuit, preferably in a few pulse height ranges; or the entire spectrum can be recorded by means of a multichannel pulse height analyzer, pulse height ranges can be selected out of the total spectrum, and these pulse height ranges can be shifted until the given numerical relationship has been reached.

In each case, the shift parameter is a measure for the degree of quench. In the case of constant amplification and high voltage, this will preferably be one of the thresholds which is shifted until the given numerical relationship has been reached. In the case of fixed thresholds or channels, respectively, the shift parameter is preferably the follow-up gain or the high voltage.

The advantages of the method according to the invention compared, for example, to the conventional external standard channels ratio method, ESCR, are initially in its great dynamic range. Since the thresholds of pulse height ranges follow the spectral shift caused by quenching, it cannot happen, as with the ESCR, that spectra shift from fixedly preselected channels in which case a quench correction is no longer valid or is even impossible to measure. If, moreover, the distances between the individual thresholds and the numerical ratio of the pulse rates is selected in such a way that the lower threshold of the upper pulse height range comes to lie on the steeply descending portion of the sample spectrum or of the external standard spectrum, much higher sensitivities can be realized during the degree of quench determination than with the other methods.

A further advantage is that the pulse height ranges used for standardization can be set in such a way that sample spectra will not be covered thereby. This results in a simplification of the measurement in that it is no longer necessary to subtract the sample spectra. In connection therewith there exists the further advantage that the low energy portion of the spectrum generated by the external standard can be excluded since in this range falsifications may occur due to the immigration of scintillations into the walls of the vessel.

A further advantage is the easy way of optimizing the sample measuring channels. If the position of a threshold disposed in the steeply descending portion of the spectrum is selected directly as the shift parameter, then the thresholds of the sample measuring channels can be shifted, with logarithmic amplification, by the same amount or with linear amplification by the same factor, respectively. This simple relationship can be refined even further.

By suitable selection of the numerical relationship on the one hand and the shift parameter on the other hand inaccuracies as may occur in a determination of the inflection point of a pulse height spectrum cannot occur here.

Still unsolved in the above described method according to the invention is the partial problem of having to use different calibration quench samples for the color quench and for the chemical quench which leads to errors if the type of quenching in the unknown samples is not known.

German Offenlegungsschrift, No. 2,521,904, of the applicant, which has already been mentioned as prior art, discloses the consideration of an undetermined proportion of chemical quenching and color quenching by determining an additional measuring value. This additional measuring value is compared with a calibration field which considers the differences between chemical quenching and color quenching. Then the external standard channels ratio is measured and is corrected by the additional measured value which is characteristic for the proportion of chemical and color quenching. However, according to the present invention, the ESCR method can be completely avoided for the following reasons.

According to the invention it is provided that the slope of the measured spectrum in the region of its steep upper descending edge is selected as the additional measuring value. This slope can be used as an independent measure for the quench and is suitable particularly in conjunction with the above-described use of a shift parameter according to the invention, as a measure for the degree of quench. In the latter case, the slope is selected preferably in the region of the threshold determined to be the shift parameter or the threshold determinative for the shift parameter.

Whether now the slope of the pulse height distribution in the upper portion of the spectrum is determined independently or in conjunction with the shift parameter, the general rule always applies that the pulse height spectrum is less steep in its upper descending portion the greater is the proportion of color quenching.

The use of the slope in the upper descending region of the pulse height spectrum as a measure for the proportion of color quenching is an advantageous feature in one aspect of the invention. A feature directed in particular to especially advantageous methods is the ability to use the shift parameter on the one hand, and the slope at the upper descending portion of the pulse height spectrum, on the other hand, and to link these parameters in a favorable manner in the measuring technique. Thus, in another aspect of the invention both quenching parameters are preferably linked together in a manner such that the proportions of chemical quenching and color quenching may be separately considered.

It is understood that the method according to the invention is preferably fully automatic, including all its numerical linkages. Appropriate programming stages may be provided for this purpose.

The invention will be explained in more detail below with the aid of characteristic diagrams.

BRIEF DESCRIPTION OF THE DRAWINGS

FIGS. 4, 8 and 9 relate particularly to the difference between chemical quenching and color quenching.

DETAILED DESCRIPTION OF THE PREFERRED EMBODIMENTS

Figure 1:
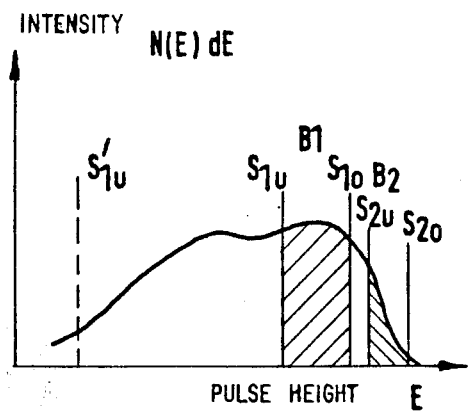
FIGS. 1 through 3 relate to particularly expedient selections of thresholds or channels, respectively, for the determination of quench with the aid of a variable shift parameter.

In FIG. 1, any pulse height spectrum as it may occur in practice is plotted by way of a solid line representing the intensity N(E) dE over the pulse height E. Two channels $B_1$ and $B_2$, each of constant width, are marked off in the spectrum. The lower energy channel $B_1$ has a lower threshold $S_{1u}$ and an upper threshold $S_{1o}$, while the higher energy channel $B_2$ has a lower threshold $S_{2u}$ and an upper threshold $S_{2o}$. In the illustrated example, both thresholds $S_{1o}$ and $S_{2u}$ are spaced from one another. It is, however, also possible for $S_{1o}$ and $S_{2u}$ to be one and the same.

The relative parallel shift of both functionally constant channels, for example, may be selected as the shift parameter which is varied until the given numerical relationship between the pulse rates of the two channels $B_1$ and $B_2$ has been reached.

As a variant, the lower threshold $S'_{1u}$ is shown in dashed lines below the threshold $S_{1u}$, which lower threshold is then intended to represent a fixed lower threshold of channel $B_1$.

To vary the shift parameter, all other thresholds can then be shifted while keeping their mutual distances the same.

Figure 2:
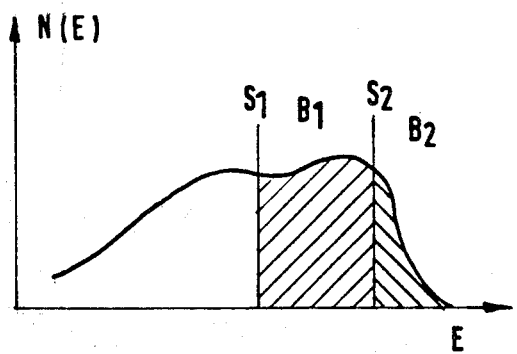

FIG. 2 shows a similar pulse spectrum as FIG. 1, with a different combination, however, of the pulse height ranges. Channel $B_1$ here has a lower threshold $S_1$ and an upper threshold $S_2$ and channel $B_2$ has only a lower threshold $S_2$, the lower threshold of channel $B_2$ being selected to be equal to the upper threshold of channel $B_1$. However, the channels may also be spaced from one another as in the example of FIG. 1.

Figure 3:
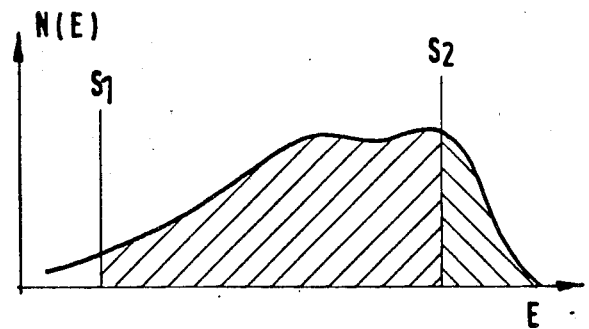

As a variant, the channel $B_1$ could also have only the lower threshold $S_1$ and be unlimited at the top (FIG. 3).

Instead of a pulse height range without upper limit, a pulse height range may be used which always includes the upper end of the pulse height range but is limited at the upper end of the pulse height range or above it.

The threshold $S_1$ as well as the threshold $S_2$ can be used as the shift parameters and so can, if required, the relative change in position of these thresholds if they are both shifted.

The above-mentioned examples are illustrated in FIGS. 1 and 2 with channels having constant widths, as they are used preferably in pulse height spectra produced by logarithmic amplification. If, however, the amplification is linear, the channels having constant, absolute widths must be replaced by channels having a constant, relative width, i.e. the channel width increases proportionally with the channel position. This is what is meant by the constant functional width of a channel.

If, however, the amplification of a measuring transducer device or its high voltage are varied and the channels or thresholds, respectively, are kept constant, for example, this must be equated with a shift of all thresholds relative to the spectra.

All thresholds which are shifted can be used as shift parameters as well as values which are functionally derived therefrom.

In order to attain the greatest possible sensitivity in the determination of the degree of quench, it is desired to realize the greatest possible change in the numerical relationship of the pulse rates in the individual pulse height ranges with respect to a lesser change in the degree of quench. This is accomplished, for example, if the lower threshold of the upper pulse height region lies in the steeply descending portion of the spectrum of an external standard or of the sample, respectively.

Figure 4:
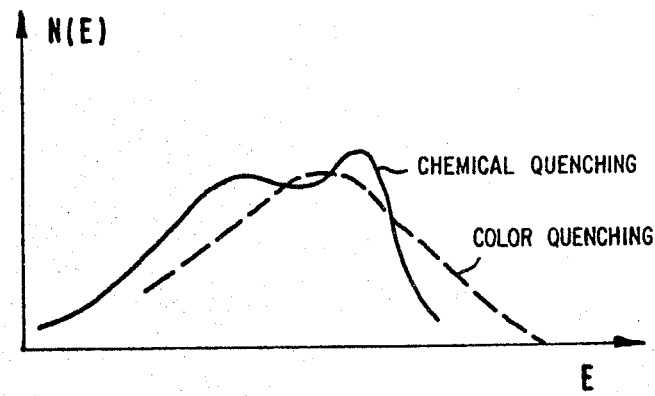
FIGS. 4 through 9 relate to particularities of measuring the slope at the upper descending end of the pulse height spectrum.
Figure 5:
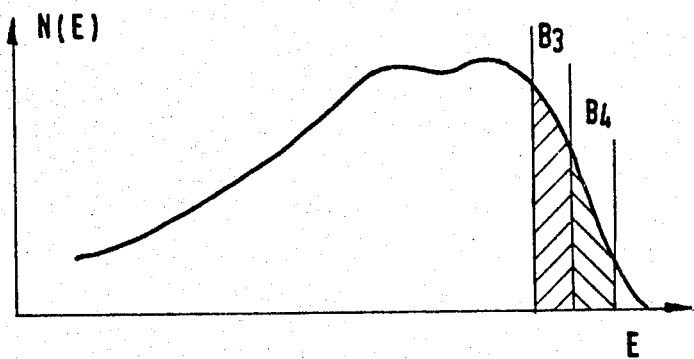

FIG. 4 shows two pulse height spectra having approximately the same degree of quench caused by $^{137}$Cs as the external standard, however the one pulse height distribution is determined mainly by chemical quenching and the other mainly by color quenching. In order to determine the slope in the upper descending portion of the pulses, the procedure may be as follows (FIG. 5): two additional channels $B_3$ and $B_4$ are used which both lie in the steeply descending portion of the pulse height distribution and the ratio of the pulse rates is measured. Both channels may have a common threshold; but this is not mandatory.

Figure 6:
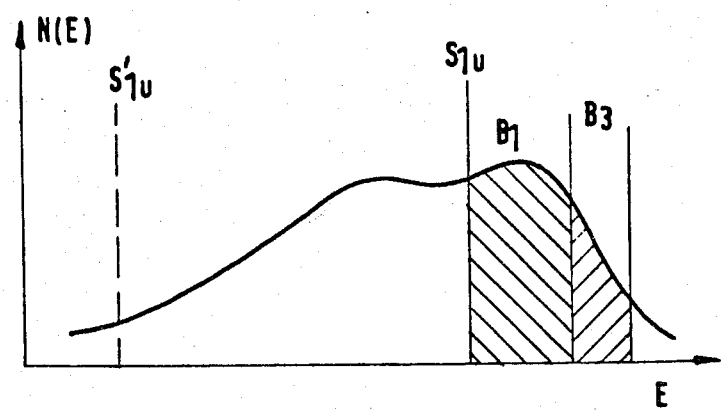

Alternatively (FIG. 6), one of the two channels may be identical with the pulse height range $B_1$ used to measure the shift parameter so that only one additional channel $B_3$, is required. $B_3$ may again be part of $B_2$.

The ratio of the pulse rates in $B_3$ and $B_4$, $B_2$ and $B_3$ or $B_1$ and $B_3$, respectively, may be used as a measure for the slope. $B_1$ may be characterized either by a movable lower threshold $S_{1u}$ or by a fixedly set threshold $S'_{1u}$. When a fixed lower threshold $S'_{1u}$ is used, experience has shown that the best results are attained if this threshold lay at the very lowest edge of the spectrum.

Figure 7:
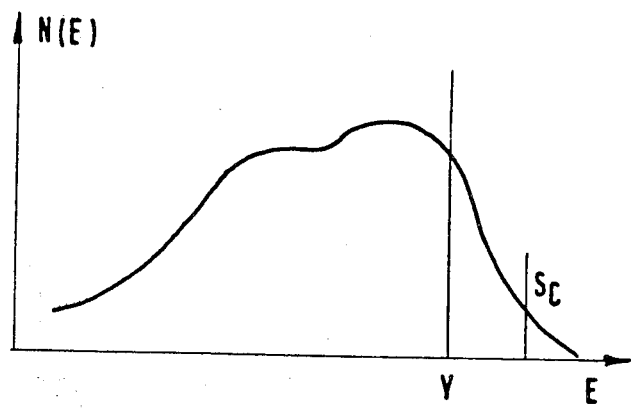

A further alternative for measuring the slope is the following (FIG. 7): first the shift parameter Y is determined, for example the lower threshold of $B_2$, and then only one additional threshold $S_C$ is shifted until the ratio of the pulse rates of the region above $S_C$ to the pulse rate in $B_1$ or $B_2$ meets a further given numerical relationship.

The value of the slope is here called the C value while the distance $S_C$-Y can be viewed as the reciprocal of the slope.

Figure 8:
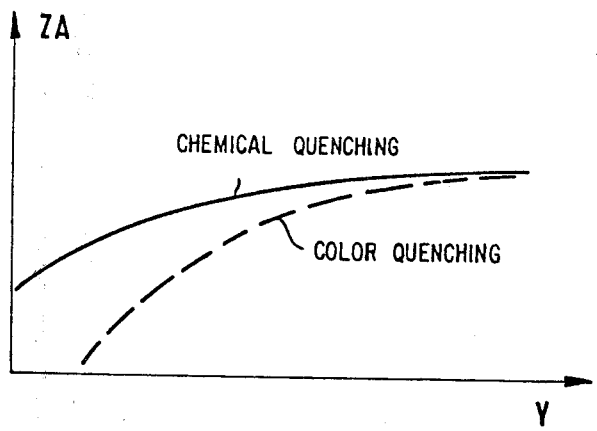
Figure 9:
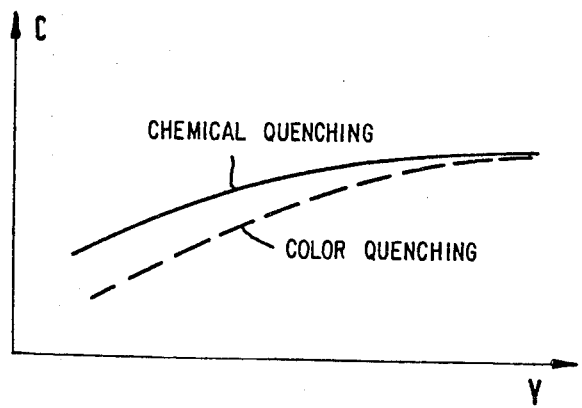

A combination of the shift parameter Y and the C value provides a determination of the degree of quench practically independently of the relative proportion of chemical quenching and color quenching. For this purpose, a calibration field can be set up, for example, to determine the degree of quench for each pair of values Y and C. Since this requires a not inconsiderable amount of memory capacity, a simpler way to effect color quench correction is desirable. FIG. 8 shows the counting yield as a function of the shift parameter Y, once for a purely chemical quench and once for a purely color quench. The deviations occurring here are certainly comparable to those encountered in the external standard channels ratio method. For the same samples, the measured C value can be plotted as a function of Y (FIG. 9). If C lies on the color quench curve, the counting yield is determined by means of the color quench curve of FIG. 8; the procedure is similar in the case of a purely chemical quench. In practice, the situation will usually lie between the two extreme cases of purely chemical quench and purely color quench and the values must be interpolated. In the simplest case, linear interpolation is employed.

Figure 10:
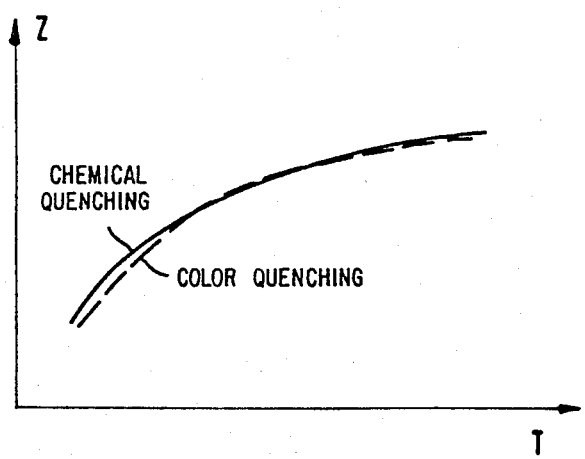
FIG. 10 depicts a way of using a calibration curve which is indifferent with respect to chemical quenching and color quenching.

One also can attempt to bring the two curves into coincidence in the Y-ZA diagram. In this case, one would have a single universal calibration curve, independent of the relative proportion of color quenching and chemical quenching. It has been found that this is possible if one defines, e.g., a new parameter T which follows the following relationship:

$$T = Y \pm a/C \pm b/C^2$$

where a and b are constants. In this case the curves for chemical quenching and color quenching lie very close together so that further correction, for practical purposes will be unnecessary (FIG. 10). Instead of the value 1/C, one can also use the value $S_C$-Y.

The foregoing relationship between T, Y and C or $S_C$-Y, respectively, is to be understood as merely an example; other mathematical linkages are just as suitable.

In a further feature of the invention it has been found to be of great advantage to measure the spectra to be recorded in order to determine the quench correction with respect to an external standard or a sample, by means of only one photomultiplier which is gated by coincidence. This has the result, firstly, that the deviation of the uncorrected curves for chemical quenching and color quenching, i.e. in the Y-ZA diagram, is much less right from the start. Additionally, however, the deviation in the Y-C diagram is greater, so that the method gains considerably in accuracy.

The following terms and facts, which will be explained in detail with examples, form the basis of the present application.

The "energy spectra" of the beta particles in the sample are given. Also given is the energy spectrum for the Compton electrons of an external standard.

Thus, for a given sample the light emission spectrum is also given.

The light quanta impinge on two photomultipliers; both photocathodes generate photoelectrons.

The anodes generate pulses whose heights in a given photomultiplier are functions of:
1. the number of photoelectrons actuated at the cathode; and
2. the high voltage applied across the photomultiplier.

The pulses from the anodes of the two photomultipliers are summed and amplified.

The "pulse height spectrum" appears at the output of the amplifier.

With a given sample or a given external standard, respectively, the pulse height spectrum can be influenced by the selection of the "high voltage" as well as the "amplification factor". Thus these two parameters are applicable as setting values in a control circuit.

The pulse height spectrum represents the pulse rates as a function of pulse heights, the latter measured as voltage pulses. The abscissa of the pulse height spectrum could therefore be calibrated in volts; but calibration in terms of energy (E) is also customary, although the pulse height spectrum represents the original energy spectrum only within limits.

If the pulse height spectrum originates from beta particles of the sample, it is here called the "sample spectrum". If, however, it originates from an external standard, it is called the "Compton spectrum".

"Pulse height ranges" are all pulse heights which lie between a lower and an upper given pulse level (threshold). The lower threshold may also be zero, the upper threshold may be infinite. Instead of pulse height range, the term "channel" or "energy channel" are also customarily used.

The "counting rate in a pulse height range" is the number of all pulses per unit time whose pulse heights lie within the given pulse height range. The "counting rate of the sample spectrum" is thus the rate of pulses occurring in one or a plurality of pulse height ranges and originating from the beta radiator in the sample. Correspondingly, the "counting rate of the Compton spectrum" is the rate of pulses originating from the external standard.

The counting rates in given pulse height ranges must fit into a given numerical relationship, i.e. as defined by a shift parameter.

The following example may serve as an explanation (see also FIGS. 1 to 3):
1. The observation is intended to be directed to a Compton spectrum.
2. Two pulse height ranges are assumed to be provided.
3. The given numerical relationship between the counting rates occurring in the two pulse height ranges is assumed to be a constant ratio; for example the ratio of the counting rates in the upper pulse height range to that in the lower pulse height range is assumed to be 1:5.

The selection of pulse height ranges on the one hand or sample or Compton spectrum, respectively, on the other hand, relative to one another as defined by the present invention and as determined by a shift parameter means that with increasing quenching either the pulse height ranges are shifted downwardly while the sample or Compton spectrum is not changed by a shift parameter, or the sample or Compton spectrum is shifted upwardly with an increase in high voltage or amplification while the pulse height ranges remain unchanged.

For better understanding, one might now imagine that FIG. 1 represents the state for an unquenched sample. With increasing quenching the spectrum would shift to the left and the ratio of the counting rates in the two channels would change, in this case would become smaller.

The shift parameter must now re-establish the given ratio of the counting rates in the two pulse height regions by "shifting" a suitable setting parameter into a desired state. There are several possibilities for this:

1. The high voltage across the photomultipliers is increased. Due to the increase in the electron multiplication at the dynodes connected therewith, the pulse height spectra are then again displaced to the right. In this case, the shift parameter would be the "increase" in the high voltage until the original ratio of 1:5 of the pulse rates in the two pulse height ranges is re-established.

2. Exactly the same effect as increasing the high voltage can also be realized by increasing the electronic gain factor. In that case, the shift parameter would be the "increase" in amplification.

3. Instead of changing the high voltage or the gain, the given numerical relationship can also be re-established by shifting all pulse height ranges downwardly. For example, if the amplifier has a linear amplification characteristic, all four thresholds one lower threshold and one upper threshold for each pulse height range, may be multiplied by a factor that re-establishes the original 1:5 of the counting rates in both channels.

In this case the shift parameter is the factor that re-establishes the original ratio.

If the amplifier has a logarithmic characteristic, the thresholds would all be lowered by the same amount until the original ratio of the counting rates in the two channels is again 1:5. In this case shift parameter is the amount the thresholds are shifted (for example in volts to) to re-establish the ratio of 1:5 for the counting rates in both channels.

The use of the shift parameter for quench corrections corresponds to that in the external standard channels ratio, i.e. a series of calibrations determines the connection between shift parameter and counting yield and this is used for unknown samples (FIGS. 8 to 10).

I claim:

1. In a method for determining the quench corrected counting yield of samples which emit ionizing radiation that is subject to quenching in a liquid scintillation counter, wherein the output signal of a photoelectric transducer device is used to measure the counting rates of the sample energy spectrum in different given pulse height ranges, and a value characteristic for the quenching is derived from the measurement to determine a quench corrected counting yield, the improvement wherein the value characteristic for the quenching is derived by: assigning a given numerical relationship between the counting rates in different given pulse height ranges; choosing a shift parameter which when varied causes a relative shift between the given pulse height ranges, and the sample spectrum; effecting the relative shift by varying the shift parameter until the counting rates take on the given numerical relationship; and determining the shift parameter value that produces the given numerical relationship as the value characteristic for the quenching.

2. A method according to claim 1 wherein the sample is irradiated by an external standard to produce a Compton spectrum which becomes the sample spectrum that is measured.

3. A method according to claim 1 or 2 wherein the photoelectric transducer device comprises a photomultiplier arrangement having an amplification factor and one of the amplification factor and high voltage of the arrangement is chosen as the shift parameter for use in said step of effecting a relative shift.

4. A method according to claim 2 further comprising the step of adjusting the pulse height ranges for the sample measurement in dependence on the variation in the shift parameter resulting from said effecting step.

5. A method according to claim 1 or 2 wherein the different given pulse height ranges comprise two pulse height ranges and each such range is limited by only a respective lower threshold and the higher of the two lower thresholds is chosen as the shift parameter for use in said step of effecting a relative shift.

6. A method according to claim 1 or 2 wherein the measurement of the spectrum comprises measuring the counting rates in a plurality of given pulse height ranges and selecting certain pulse height ranges as determined by the shift parameter.

7. A method according to claim 6 wherein the given pulse height ranges comprise two directly adjacent pulse height ranges having a common threshold, and the common threshold is chosen as the shift parameter for use in said step of effecting a relative shift.

8. A method according to claim 6 wherein at least one given pulse height range is part of a larger pulse height range.

9. A method according to claim 8 wherein the larger pulse height range and the one given pulse height range each have a lower respective threshold and the lower threshold of the larger pulse height range is selected to be lower by a functionally determined amount than the lower threshold of the one given pulse height range.

10. A method according to claim 8 wherein the larger pulse height range covers the entire spectrum.

11. A method according to claim 8 wherein the larger pulse height range is constricted only on the low energy side of the spectrum.

12. A method according to claim 1 or 2 wherein the measurement of the spectrum comprises the step of iteratively measuring the counting rates in at least two given pulse height ranges of functionally given width until the counting rates take on the given numerical relationship.

13. A method according to claim 12 wherein at least one given pulse height range has only one threshold.

14. A method according to claim 12 wherein at least one of the given pulse ranges includes at least one threshold which is chosen as the shift parameter, the spectrum has a steep upper descending edge, and the numerical relationship of the counting rates in the pulse height ranges is assigned so that the threshold chosen as the shift parameter lies in the steep upper descending edge of the measured spectrum.

15. A method according to claim 14 further comprising the steps of determining an additional measuring value and comparing the additional measuring value with a calibration field which considers the difference between chemical quenching and color quenching, wherein the additional measuring value is the slope of the measured spectrum in the region of its steep upper descending edge and in the region of the threshold which has been chosen as the shift parameter.

16. A method according to claim 15 further comprising the step of specifying an auxiliary pulse height range lying at the upper end of the spectrum and having a constant functional width and a lower threshold, said step of specifying being conducted in such a manner that the ratio of the counting rates in the auxiliary pulse height range and one of the given pulse height ranges meets a second numerical relationship, and the difference between the lower threshold of the auxiliary pulse height range and the threshold which comprises the shift parameter is used as a measure for the slope.

17. A method according to claim 15 further comprising the step of specifying an auxiliary pulse height range enclosing the upper end of the spectrum and having a variable width and lower threshold, said step of specifying being conducted in such a manner that the ratio of the counting rates in the auxiliary pulse height range and one of the given pulse height ranges meets a second numerical relationship, and the difference between the lower threshold of the auxiliary pulse height range and the threshold which comprises the shift parameter is used as a measure for the slope.

18. A method according to claim 15, further comprising the step of determining the slope by measuring the ratio of the counting rates of two auxiliary pulse height ranges lying above and below the threshold chosen as the shift parameter.

19. A method according to claim 18 wherein the measurements in the auxiliary pulse height ranges are performed simultaneously with said step of iteratively measuring the counting rates in given pulse height ranges and the ratio of the counting rates which is determinative for the slope is based on the value characteristic for the quenching.

20. A method according to claim 15 further comprising the step of determining the slope by measuring the ratio of the pulse rates in an auxiliary pulse height range of given width above the threshold which has been chosen as the shift parameter and the pulse rates in one of the given pulse height ranges.

21. A method according to claim 20 wherein the measurement in the auxiliary pulse height range is performed simultaneously with said step of iteratively measuring the counting rates in given pulse height ranges and the ratio of the counting rates which is determinative for the slope is based on the value characteristic for the quenching.

22. A method according to claim 15 further comprising the step of using a mathematical linkage of the shift parameter value with the value derived from the measure for the slope to determine the quench corrected counting yield.

23. A method according to claim 22 wherein the mathematical linkage used is essentially the sum or difference of the shift parameter value and a linear function of the reciprocal value of the measure for the slope.

24. A method according to claim 22 wherein the mathematical linkage used is essentially the sum or difference of the shift parameter value and a quadratic function of the reciprocal value of the measure for the slope.

25. A method according to claim 22 wherein the mathematical linkage employed is essentially the sum or difference of the value of the shift parameter and a linear functon of the value which is determinative for the slope.

26. A method according to claim 22 wherein the mathematical linkage employed is essentially the sum or difference of the value of the shift parameter and a quadratic function of the value which is determinative for the slope.

27. A method according to claim 15 wherein the output signals of the photoelectric transducer device comprise analog signals, and only the analog output signals are used to generate the pulse height spectrum.

28. A method according to claim 27 wherein the photoand the analog output signals of one photomultiplier and of the other photomultiplier are alternatingly used for identical total measuring periods to generate the pulse height spectrum.

* * * * *